J. ROSS.
Apparatus for Preventing Dust from Rising from Thrashing Machines.
No. 971.   Patented Oct. 8, 1838.
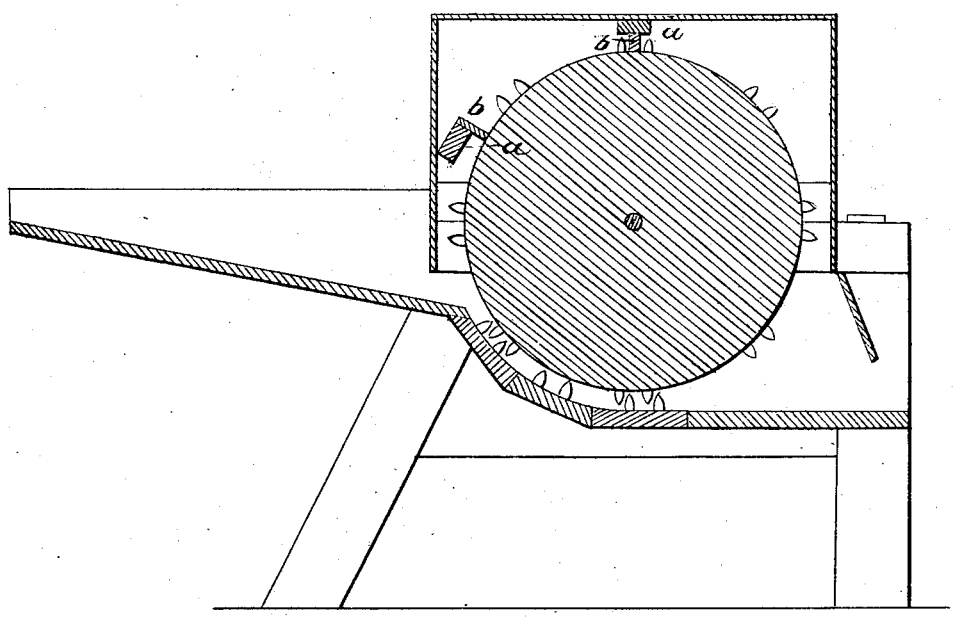
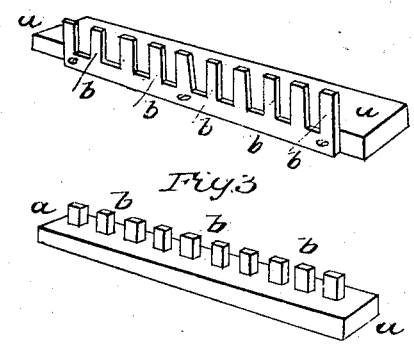

UNITED STATES PATENT OFFICE.

JOSEPH ROSS, OF BOUNDBROOK, NEW JERSEY.

MODE OF PREVENTING DUST FROM RISING FROM THRESHING-MACHINES WHEN IN OPERATION.

Specification of Letters Patent No. 971, dated October 8, 1838.

*To all whom it may concern:*

Be it known that I, JOSEPH ROSS, of Boundbrook, in the county of Somerset and State of New Jersey, have invented a new and useful Apparatus for Preventing Dust from Rising from Threshing-Machines; and I do hereby declare that the following is a full and exact description thereof, reference being had to the drawings accompanying and making part of this specification.

Figure 1, represent a sectional part of a threshing machine with this apparatus attached to it. Fig. 2, a view of the comb with the projections secured to the edge. Fig. 3, a view with the teeth inserted in the center.

*a, a*, is an oblong piece of wood, iron or any suitable material, equal in length to that of the cylinder of the threshing machine to which it is to be attached, and of a convenient width with projections *b* of iron, leather or any other suitable material extending from either the edge or middle of it at right angles, and in length equal to the length of the teeth on the cylinder. This comb being attached to the bonnet of the threshing machine in such a manner as, that in the revolution of the cylinder the projections fill the space between the teeth, arrests the current of air produced by said revolution, which would naturally drive the small particles of chaff and dust out at the feeder, thereby preventing this great annoyance to the operator or attendant.

What I claim as my invention and desire to secure by Letters Patent, is,

The attaching of one or more combs or racks such as herein described to the inside of the bonnet or outer covering of a threshing machine on that side of the cylinder opposite the concave or that part of the machine which contains the grain during the operation of threshing for the purposes hereinbefore set forth and described.

JOSEPH ROSS.

Witnesses:
JOHN W. HUBBARD,
LUCIAN OSGOOD.